United States Patent [19]

Nakata et al.

[11] Patent Number: 5,057,766

[45] Date of Patent: Oct. 15, 1991

[54] APPARATUS FOR DETECTING POSITION OF CHARGED PARTICLE

[75] Inventors: Shuhei Nakata; Takafumi Nakagawa; Takashi Hifumi, all of Amagasaki, Japan

[73] Assignee: Mitsubishi Denki Kabushiki Kaisha, Japan

[21] Appl. No.: 533,451

[22] Filed: Jun. 5, 1990

[30] Foreign Application Priority Data

| | | | |
|---|---|---|---|
| Jun. 6, 1989 | [JP] | Japan | 1-142065 |
| Jun. 8, 1989 | [JP] | Japan | 1-144091 |
| Sep. 11, 1989 | [JP] | Japan | 1-236354 |
| May 14, 1990 | [JP] | Japan | 2-121126 |

[51] Int. Cl.$^5$ .......... G01N 27/00

[52] U.S. Cl. .......... 324/71.3; 324/452; 324/457; 324/71.1

[58] Field of Search .......... 324/71.3, 71.1, 452, 324/453, 454, 455, 457, 459, 464, 465, 466, 467, 468, 469, 470, 663, 683, 686, 690, 605, 404, 409

[56] References Cited

U.S. PATENT DOCUMENTS

| | | | |
|---|---|---|---|
| 3,293,429 | 12/1966 | Leboutet et al. | 324/71.3 X |
| 3,496,463 | 2/1970 | Johnson et al. | 324/71.1 |
| 3,836,850 | 9/1974 | Coulter | 324/71.1 |
| 4,060,762 | 11/1977 | McKeown | 324/71.1 |
| 4,438,390 | 3/1984 | Hogg | 324/71.1 |
| 4,607,194 | 8/1986 | Yin | 324/71.1 X |

OTHER PUBLICATIONS

E. Bozoki et al., IEEE Transactions on Nuclear Science, vol. NS-30, No. 4, "Closed Orbit Correction of the NSLS VUV Ring", Aug. 1983, pp. 3106-3108.

E. Higgins, IEEE Transactions on Nuclear Science, vol. NS-22, No. 3, "Beam Signal Processing for the Fermilab Longitudinal and Transverse Beam Damping Systems", Jun. 1975, pp. 1581-1585.

Bergere et al, "Linac Beam Position Monitor", *The Review of Scientific Instruments*, vol. 33, No. 12 (12/62) pp. 1441-1449.

*Primary Examiner*—Kenneth A. Wieder
*Assistant Examiner*—Robert W. Mueller
*Attorney, Agent, or Firm*—Leydig, Voit & Mayer

[57] ABSTRACT

An apparatus for detecting the position of a charged particle in a duct pipe has a plurality of electrodes arranged in the duct pipe. Detection signals obtained in the electrodes are phase-delayed by predetermined amounts and then added to form an integral detection signal. The integral detection signal is input to a circuit which determines waveforms representative of the passage of the charged particle: namely, the D.C. component of the detection signal, fundamental wave component and a phase-shifted fundamental wave component. The position of the charged particle are determined from these components. A part of each electrode is formed of a dielectric member. Each electrode and an associated connector are covered by a double-shield structure with inner and outer shields, the electrode, the connector and the inner shield being electrically insulated from the duct pipe.

11 Claims, 6 Drawing Sheets

APPARATUS FOR DETECTING POSITION OF CHARGED PARTICLE

BACKGROUND OF THE INVENTION

1. Field of the Invention

The present invention relates to an apparatus for use in a circular charged particle accelerator or a particle accumulation ring and capable of detecting the position of an accelerated charged particle precisely and quickly with a high degree of sensitivity.

2. Description of the Related Art

FIG. 1 is a circuit diagram showing a position detector and a signal processing circuit which are used in a known charged particle position detection apparatus of the type which is disclosed, for example, in an article presented by T. Ieiri et al., in IEEE Transactions on Nuclear Science, Vol. NS-30, No. 4 (Aug., 1983), pp 2356–2358. Referring to this Figure, a position detector 1 is used in a particle accelerator such as a circular charged particle accelerator, a particle accumulator ring and so forth, and is capable of detecting the position of a charged particle passing through a vacuum duct. The detector 1 includes a plurality of electrodes secured to the vacuum duct and capable of picking up the position of the passing charged particle as an induced charge. In the illustrated case, four electrodes 2 to 5 are used. Transmission lines 6 to 9 are connected to the respective electrodes 2 to 5 so as to transmit signals from these electrodes to circuits for processing these signals. Mixers 10 to 13 with filters are electrically connected to these transmission lines 6 to 9 and also to an oscillator 14. These mixers 10 to 13 are capable of picking up the second higher harmonic components of passage frequencies produced when a charged particle passes by the electrodes 2 to 5.

FIGS. 2 and 3 are sectional views of a known position detector which is used as the position detector 1 shown in FIG. 1 and which is disclosed, for example, in Proceeding of The 5th Symposium on Accelerator Science and Technology, 154–156, 1984. In these Figures, a pipe 15 forms a vacuum duct or a vacuum chamber, while 16 denotes an orbit of a charged particle.

FIG. 4 is a sectional view of another position detector of the type which is proposed by Tomotaro Katsura and Shinkichi Shibata in Beam Position Monitor for the Photon Factory Storage Ring. The position detector 1A has, in addition to electrode plates 2 to 5, a BNC connector 17 for externally picking up detection signal indicative of the position of the charged particle, and a supporting guide 18 supporting the BNC connector 17. Numeral 19 denotes a charged particle, while 16A denotes the central axis of the charged particle 19. An electrode 2 is supported by a supporting guide 18 together with the BNC connector 17. When a charge is induced by an electric field formed around the charged particle 19, the electrode 2 picks up this charge as the detection signal indicative of the position of the charged particle, and delivers this detection signal to the BNC connector 17. Similarly, other electrodes 3 to 5 are supported by the respective supporting guides (not shown) and deliver detection signals to the BNC connector 17. The BNC connector 17 is grounded commonly with the vacuum chamber, i.e., the pipe 15.

The operation principle of the known charged particle position detectors shown in FIGS. 1 to 3 is as follows.

When a charged particle passes a certain position in the orbit 16 within the vacuum duct, charges are induced in the electrodes 2 to 5 as functions of the distances between the above-mentioned certain position and the respective electrodes, whereby voltages are generated in these electrodes. These voltages are delivered to the mixers 10 to 13 with filters through the transmission lines 6 to 9 so as to be processed. In this case, the position x, y of the axis of the charged particle on a fixed coordinate is related to the voltages $V_1$ to $V_4$ induced in the electrodes as follows.

$$x \propto (V_1+V_2-V_3-V_4)$$

$$y \propto (V_1-V_2+V_3-V_4)$$

It is therefore possible to know the position x, y of the charged particle by means of measuring of the induced voltages $V_1$ and $V_4$. The induced voltages $V_1$ to $V_4$ are delivered through the transmission lines 6 to 9 to the mixers 10 to 13 in which signal components having frequencies which is twice as high as the passage frequency are picked up and the coordinates x and y are determined in accordance with the formulae shown above using these signal components.

By comparing the quantities of the charges induced in the electrodes 2 to 5, it is possible to detect the position of passage of the charged particle.

In the known position detector 1A shown in FIG. 4, charges are induced in the electrodes 2 to 5 by an electric field formed around the charged particle 19 moving through the vacuum duct. Voltages formed as detection signals by the charges induced in the respective electrodes 2 to 5 are represented by $V_1$, $V_2$, $V_3$ and $V_4$. The movement of the charged particle 19 moving through the vacuum duct is simulated as shown in FIG. 4 and the relationships between the x, y coordinates (x), (y) of the charged particles and the following values determined by the voltages $V_1$, $V_2$, $V_3$ and $V_4$ are obtained in advance to form calibration curves as shown in FIG. 5.

$$[(V_4+V_1)-(V_2+V_3)]/(V_1+V_2+V_3+V_4)$$

$$[(V_1+V_2)-(V_4+V_3)].(V_1+V_2+V_3+V_4)$$

It is therefore possible to find the position of the charged particle 19 from the measured values of the voltages $V_1$, $V_2$, $V_3$ and $V_4$ by consultation with the calibration curve shown in FIG. 5.

In the known charged particle position detection apparatus shown in FIG. 1, the detection signals from the detector are transmitted to processing circuits through the transmission lines. It is therefore necessary to use a multiplicity of transmission lines, e.g., four transmission lines as illustrated. In addition, components such as mixers with filters have to be used in the signal processing circuits in numbers corresponding to the number of the signal transmission lines. It is necessary to eliminate any fluctuation or variation between the components of the systems connected to different signal transmission lines, with the result that much labor is required.

Problems are also encountered in that the quantity of the charges detectable is limited due to a quick change in the polarity of the induced charges as a result of passage of the charged particle, and in that the quantity of charges induced varies depending on the momentum of the charged particle.

The known position detector of the type shown in FIG. 4 also suffers from a problem in that, since the BNC connector is grounded together with the vacuum duct, and since the vacuum duct function as a kind of antenna so as to pickup external noise, the detection signals derived from the BNC connector tends to be disturbed by the noise transmitted from the vacuum duct. When the amount of charge of the charged particle is small, the level of the detection signals from the position detector also is reduced to a level lower than the level of the noise so as to become insensible. In such a case, it is impossible to detect the position of the charged particle.

SUMMARY OF THE INVENTION

Accordingly, an object of the present invention is to provide a charged particle position detector in which detection signals obtained n the detection electrodes and indicative of the position of the charged particle are transmitted to a processing circuit through a single transmission line, thus attaining a simple construction and high reliability, while enabling a high-speed computation.

Another object of the present invention is to provide a charged particle position detection apparatus capable of precisely detecting both the amount of charges on the charged particle and the position of the charged particle.

A further object of the present invention is to provide a charged particle position detection apparatus which can accurately detect the position of the charged particles even when the level of the detection signal is low due to small amount of charge on the charged particle.

To these ends, according to the present invention, there is provided an apparatus for detecting the position of a charged particle comprising: position detecting means including a plurality of electrodes secured to a vacuum duct in which the charged particle passes, the electrodes being capable of picking up the position of the charged particle passing through the vacuum duct as charges induced in the electrodes and delivering these charges as detection signals; transmission means including a plurality of transmission lines connected to the electrodes, the transmission means being capable of transmitting the detection signals from the electrodes sequentially with phase delays by predetermined amounts; adding means for adding the output signals from the transmission means so as to form an integral signal; and component detection means for detecting, from the output of the adding means, the D.C. component, the fundamental waveform component and a phase-shifted fundamental waveform component of the waveform indicative of the passage of the charged particle through a region where the electrodes are disposed.

In a preferred form of the invention, each electrode has an electrode plate on which charges are inducted in response to the passage of the charged particle, at least a part of the electrode plate being made of a dielectric material. A connector is connected to each electrode plate so as to deliver a detection signal indicative of the quantity of charge generated on the electrode plate to the exterior of the vacuum duct. A part of the electrode plate and the connector are covered by a double shield structure with inner and outer shields, the electrode plate, the connector and the inner shield being electrically insulated from the vacuum duct.

According to the invention, the detection signals derived from the plurality of electrodes are delivered in the form of a single integral signal to a circuit for processing this signal. This single integral detection signal is computed at high speed. Since the electrode plates of the electrode and the connectors are electrically insulated from the vacuum duct, charges of an amount proportional to the amount of the charged particles which pass through the duct induced on each electrode plate. In addition, the influence of the noise is suppressed because the electrode plates and the connectors are shielded.

DESCRIPTION OF THE PREFERRED EMBODIMENTS

Figure 6:
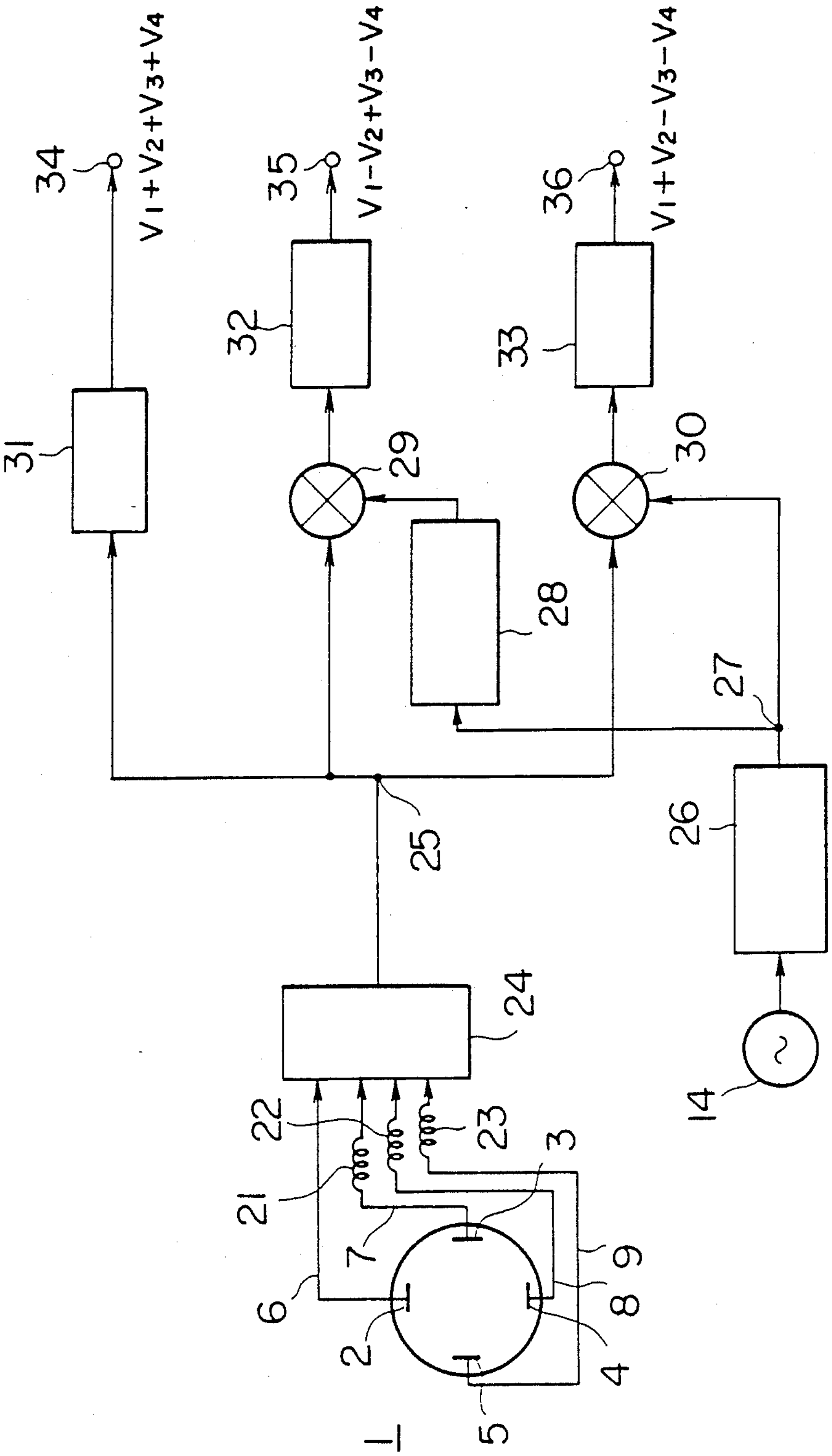
FIG. 6 is an illustration of an embodiment of the charged particle detection apparatus in accordance with the present invention.

FIG. 6 shows the construction of an embodiment of the charged particle position detection apparatus in accordance with the present invention. In this Figure, the same reference numerals are used as those used in the illustration of known arts to denote the same or like parts of these known arts.

In this apparatus, delay cables 21 to 23 are connected to transmission lines 7 to 9 leading from the electrodes 3 to 5 of a position detector 1 which provides particle position detection means. The delay cables 21 to 23 in cooperation with the transmission lines 7 to 9 and the line 6 form transmission means. The transmission line 6 and the delay cables 21 to 23 are connected to an adder 24 as adding means. The adder 24 adds four detections signals indicative of the position of a charged particle. A distributor 25 is connected to the output of the adder 24 and divides the above mixed signal in which four detection signals have been added to form one signal into three signals. An oscillator 14 is capable of generating an oscillation signal having a fundamental frequency which corresponds to the fundamental wave of the detection signal having the frequency of passage of the charged particle by the electrode. A phase shifter 26 is connected to the oscillator 14 and is capable of adjusting the phase of the signal oscillated from the oscillator 14 with respect to the detection signals from the position detector 1. A distributor 27 is adapted to drive the phase-shifted signal from the phase shifter 26 into two portions. A delay circuit 28, which is connected to the distributor 27, is adapted to effect a 90° delay of the oscillation signal which is derived from the oscillator 14 via the distributor 27 and the phase shifter 26. A mixer 29 is connected to a distributor 25 and a delay circuit 28 and is capable of mixing the detection signal from the position detector 1 and the phase-shifted and delayed signal oscillated by the oscillator 14, thus forming a fundamental wave component which is delayed by 90° from the phase of the detection signal. A mixer 30 is connected to the distributors 25 and 27 so as to mix the detection signal with the phase-adjusted signal from the oscillator 14, thereby forming the fundamental wave component of the detection signal. A filter 31 is capable of picking up D.C. components from the divided detection signal derived from the distributor 25. A filter 32 picks up the fundamental wave component with 90° phase delay behind the detection signal, from the output of the mixer 29. A filer 33 forms the fundamental wave component of the detection signal from the output of the mixer 30. These filters 31 to 33 may be low-pass filters. The amount of delay produced by the delay cable 21 is ¼ the passage frequency of the charged particle. Amounts of delay produced by the delay cables 22 and 23 are respectively 2/4 and ¾ the passage frequency of the charged particle.

In the charged particle position detection apparatus having the described construction, the position of the charged particle is detected on the basis of the proportional relationship between the position of the charged particle and the detection voltage induced in the electrodes 2 to 5 of the position detector 1. Namely, the detection signals delivered to the transmission lines 6 to 9 from the electrodes 2 to 5 of the position detector 1 are delivered to the adder 24 directly or after being delayed through the delay cables 21 to 23 as explained above. The adder 24 forms these detection signals into an integral detection signal. The integral detection signal from the adder 24 is divided by the distributor 25 into three signals which are respectively delivered to the filter 31, the mixers 29 and 30. The filter 31 extracts the D.C. component of the detection signal. Representing the voltages induced and detected in the electrodes 2 to 5 of the detector 1 by $V_1$, $V_2$, $V_3$ and $V_4$, respectively, the sum $V_1+V_2+V_3+V_4$ is obtained at the output terminal 34. The detection signal received by the mixer 29 is mixed with the signal oscillated from the oscillator 14 and phase-delayed by 90°, so that a signal corresponding to a value $V_1-V_2+V_3-V_4$ is obtained at the output terminal 35. The detection signal input to the mixer 30 is mixed with the oscillated signal so that a signal $V_1+V_2-V_3-V_4$ is obtained at the output terminal 36 through the filter 33. The position of the charged particle is then determined in the same manner as that in the known apparatus, from the voltages obtained at the output terminals 34 to 36.

According to this arrangement, an integral detection signal is transmitted from the adder 24 to the distributor 25 through a single transmission line. Thus, only one transmission line is required so that the wiring arrangement can be simplified considerably. In addition, the measuring precision is improved by virtue of the fact that the variation in the detection performance between the systems connected to different electrodes is remarkably suppressed as a result of elimination of use of a multiplicity of elements.

In addition, the measurement can be conducted at high speed because the D.C. component of the detection signal, the fundamental wave component of the detection signal and the 90° delayed fundamental wave component are automatically determined.

Although the described embodiment employs four signal lines leading from the position detector, this is only illustrative and any number of signal lines, e.g., less than four or more than four, can be merged into one single transmission line, so that the described advantages are brought about regardless of the number of the signal lines.

Figure 1:
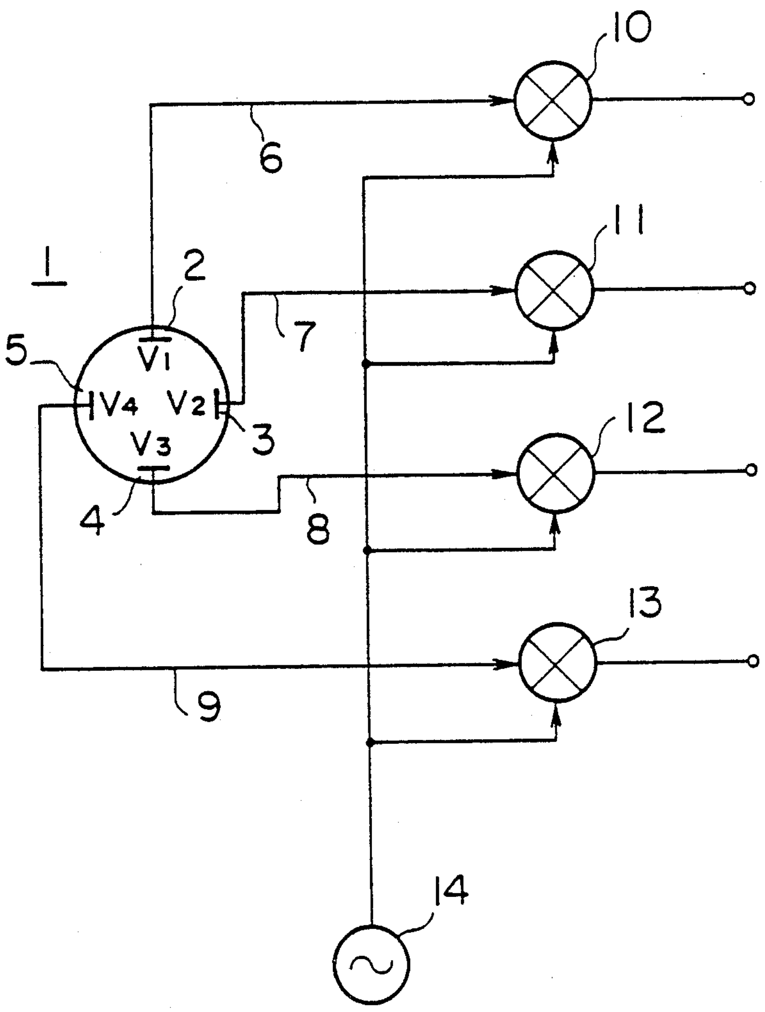
FIG. 1 PRIOR ART
FIG. 1 is a circuit diagram of a known charged particle position detection apparatus.
Figure 2:
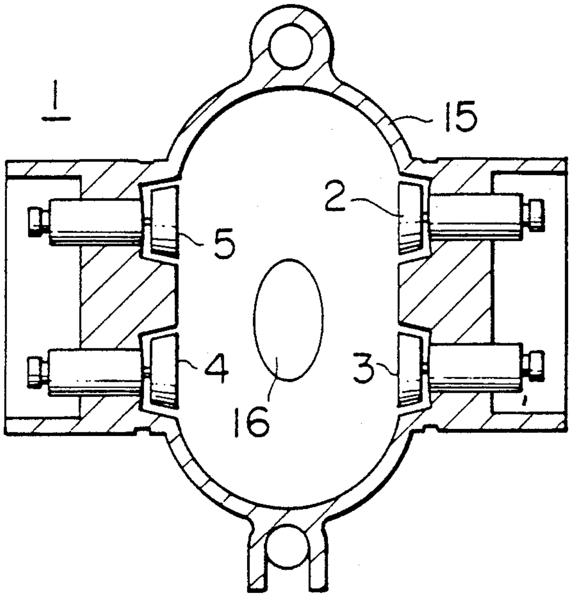
FIG. 2 PRIOR ART
FIG. 2 is a section al view of a position detector used in the charged particle position detection apparatus shown in FIG. 1.
Figure 3:
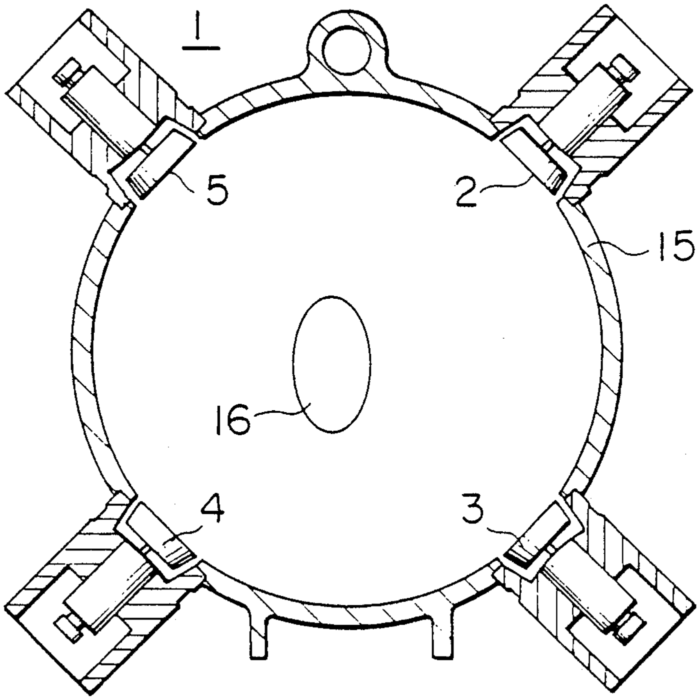
FIG. 3 PRIOR ART
FIG. 3 is a sectional view of another known position detector.
Figure 7:
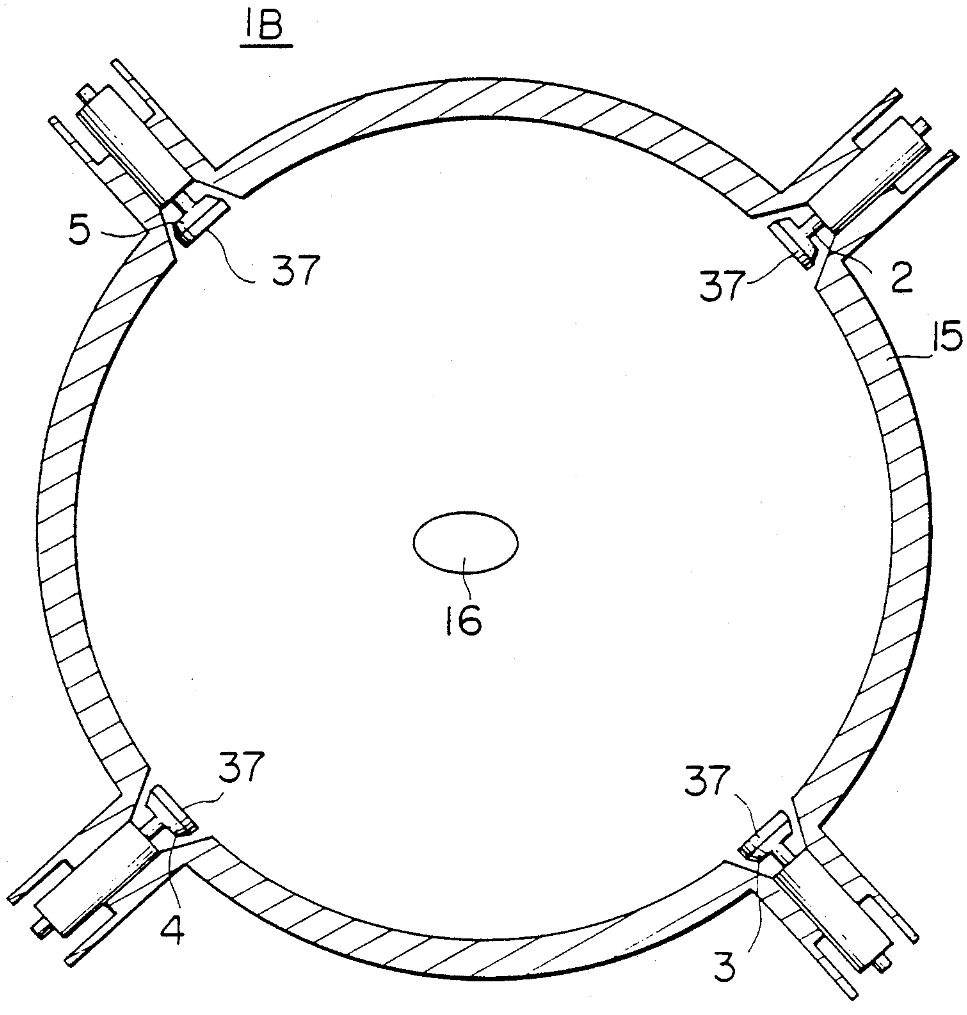
FIG. 7 is an illustration of an example of a position detector used in the charged particle position detection apparatus of the present invention.

FIG. 7 shows another example of the position detector which can be used in place of the position detector shown in FIG. 6. The position detector 1B show in FIG. 7 is different from the known position detector 1 shown in FIGS. 1 to 3 in that a dielectric member 37 is provided on the surface of each of the electrode plates 2 to 5. In the position detector 1B shown in FIG. 7, a passage of a charged particle causes a polarization of the dielectric member 37. The charges induced on the dielectric members 7 are added to the charges induced on the electrode plates to 5 contacting the dielectric members 37 and are delivered to the transmission line. By integrating the charges transmitted to the transmission line, it is possible to know the amounts of charges induced on the dielectric members 37 and, hence, the amount of charges on the charged particle passing through the vacuum duct. The position of the charged particle also can be determined from the charges induced in the respective electrodes.

Figure 4:
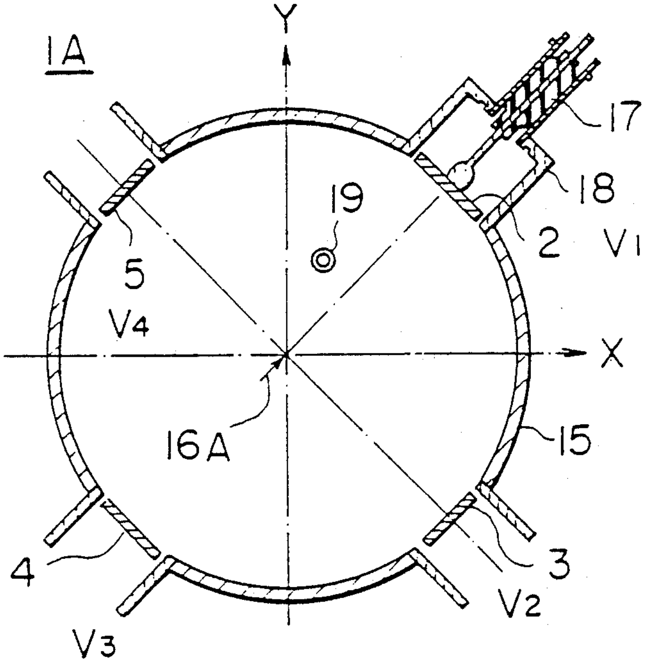
FIG. 4 PRIOR ART
FIG. 4 is a sectional view of a position detector used in another known charged particle position detection apparatus.
Figure 8:
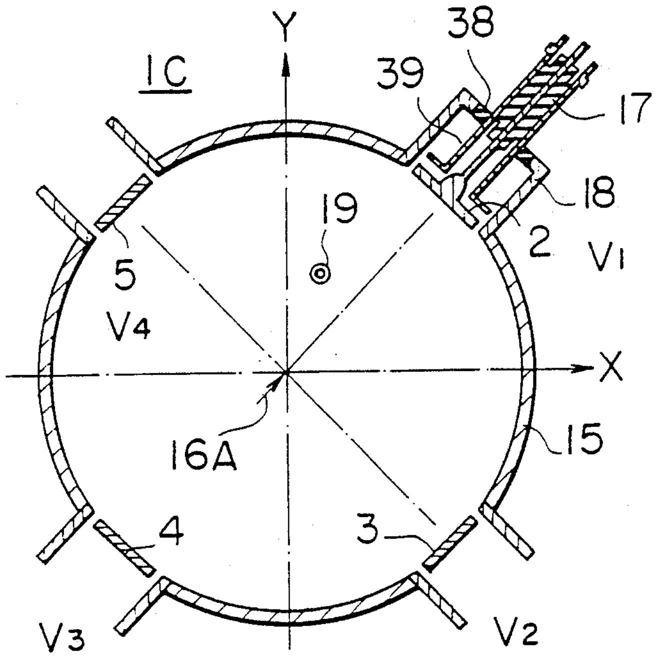
FIG. 8 is a section al view of another example of the position detector used in the apparatus of the present invention.

FIG. 8 is a sectional view of another example of the position detector which is an improvement in the known detector of the type shown in FIG. 4. Obviously, this position detector can be used in place of the position detector shown in FIG. 6. The position detector shown in FIG. 8 is different from the known position detector shown in FIG. 4 in that an insulating ceramics member 38 is placed between the BNC connector 17 and the supporting guide 18, actually the shield 39, so as to attain a perfect electrical insulation of the BNC connector 17 from the pipe 15 of the vacuum duct, and in that a grounded shield 39 is provided to cover each of the electrode plates 2 to 5 so as to doubly shield the electrode plate from external noise.

Figure 5:
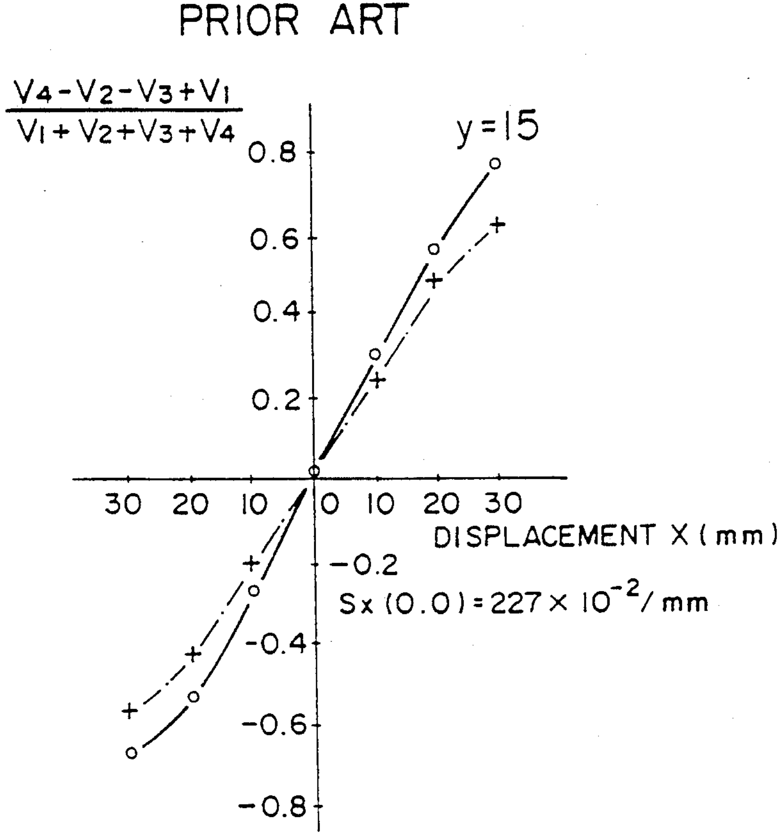
FIG. 5 PRIOR ART
FIG. 5 is a graph showing calibration curves used for a simulation.

In the position detector 1C having the described construction, the BNC connector 17 is completely insulated electrically from the pipe 15 forming the vacuum duct due to the presence of the ceramics member 38. In addition, grounded shield 39 leading from the BNC connector 17 extends to cover each electrode plate 2 so as to shield the electrode form external noise. Consequently, the noise level is lowered to enable the detection signal indicative of the particle position to be sensed even when the amount of charges of the charged particle is small. The position of the charged particle also may be detected, for example, through the comparison of the voltages $V_1$, $V_2$, $V_3$ and $V_4$ of the detected signals upon consulation with the simulation plot shown in FIG. 5, as in the case of the known apparatus.

Figure 9:
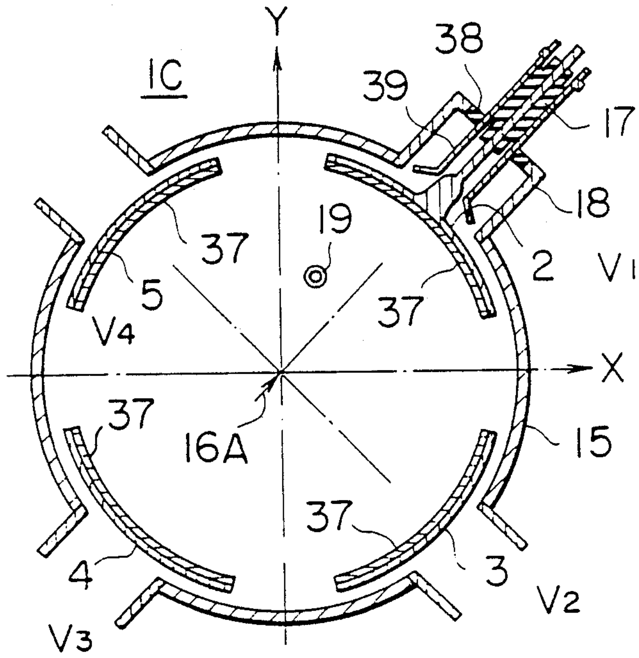
FIG. 9 is a sectional view of still another example of the position detector used int he apparatus of the present invention.

There is no restriction in the shape of the electrode plates 2 to 5. Namely, the described advantages are equally obtained substantially regardless of the shape of the electrodes. FIG. 9 shows a position detector having electrode plates 2 to 5 which extend along the pipe 15 and which are provided with dielectric members on their surfaces facing the charged particle. Although a vacuum duct having a circular cross-section is shown, the cross-sectional shape of the duct can be varied without affecting the advantages of the present invention.

As has been described, according to the present invention, the detection signals from the respective electrodes are phase-shifted and formed into an integral detection signal, and this integral detection signal is delivered to a circuit which is capable of automatically determining the D.C. component of the detection signal, fundamental wave component and 90 delayed fundamental wave component. It is therefore possible to simplify the wiring between a laboratory and a control room which heretofore employed numerous signal lines and components. For the same reason, it is possible to quickly detect the position of the charged particle. In a specific form of the invention in which a dielectric member is provided on each electrode plate in which charge is inducted in response to passage of the charged particle, it is possible to enhance the sensitivity of detection of passage of the charged particle. It is also possible to enhance the precision of measurement through reduction of noise, by providing the double-shield structure and the insulating member.

What is claimed is:

1. An apparatus for detecting the position of a charged particle comprising:

position detecting means including a plurality of electrodes secured to a vacuum duct in which said charged particle passes, said electrodes being capable of picking up the position of said charged particle passing through said vacuum duct as charges induced in said electrodes and delivering these charges as detection signals;

transmission means including a plurality of transmission lines connected to said electrodes, said transmission means being capable of transmitting said detection signals from said electrodes sequentially with phase delays by predetermined amounts;

adding means for adding the output signals from said transmission means so as to form an integral signal; and component detection means for detecting, from the output of said adding means, the D.C. component, the fundamental waveform component and a phase-shifted fundamental waveform component of the waveform indicative of the passage of said charged particle through a region where said electrodes are disposed.

2. An apparatus for detecting the position of a charged particle according to claim 1, wherein said position detection means includes four electrodes in which charge is inducted in response to the passage of said charged particle, said electrodes being arranged in a plane perpendicular to the direction of movement of said charged particle in said vacuum duct at a 90° interval in the rotational direction; wherein said transmission means includes four transmission lines connected to said electrodes and having signal phase delay amounts which are zero, $\frac{1}{4}$, 2/4 and $\frac{3}{4}$ the period of passage of said charged particle; wherein said adding means includes an adder which add the output signals from said four lines so as to form said integral signal; and wherein said component detection means includes a fundamental wave generating section capable of generating, with phase adjustment, oscillation signals having a fundamental frequency corresponding to the fundamental wave of the detection signals from said electrodes having a frequency of passage of said charged particles, a distribution section capable of distributing said integral signal from said adder, an D.C. component detection section for determining and outputting the D.C. component of the distributed detection signal, a fundamental wave detecting section for mixing the distributed detection signal and the oscillation signal from said fundamental wave generating section so as to determine and output the fundamental wave component of said detection signal, and a phase-shifted fundamental wave component detecting section capable of mixing the distributed detection signal and a signal with a 90° phase delay derived from said fundamental wave generating section so as to determine and output a 90° phase-delayed fundamental wave component of said detection signal; whereby the position of the charged particle in said vacuum duct is determined from the three values determined by said D.C. component detecting section, the fundamental wave detecting section and the phase-shifted fundamental wave detecting section.

3. An apparatus for detecting the position of a charged particle according to claim 2, wherein three out of said four transmission lines of said transmission means includes delay cables which delay said detection signals by $\frac{1}{4}$, 2/4 and $\frac{3}{4}$ the period of passage of said charged particle; wherein said fundamental wave generating section of said component detection means includes an oscillator capable of generating an oscillation signal having a fundamental frequency corresponding to said fundamental wave, and a phase shifting device for adjusting the phase of the oscillation signal from said oscillator; wherein said D.C. component detecting section of said component detection means includes a filter for picking up the D.C. component from said distributed detection signal; wherein said fundamental wave detecting section of said component detection means includes a mixer for mixing the distributed detection signal with an oscillation signal from said phase shifting device and a filter for picking up the fundamental wave component from the output signal from said mixer; and wherein said phase-shifted fundamental wave detecting section of said component detection means includes a delay circuit for effecting a 90° delay of the oscillation signal from said phase shifting device, a mixer for mixing the output of said delay circuit with the distributed detection signal, and a filter for picking up the phase-shifted fundamental wave component of the output from said mixer.

4. An apparatus for detecting the position of a charged particle according to claim 1, wherein each of said electrodes of said detection means secured to said vacuum duct includes an electrode plate in which charges are induced in response to the passage of said charged particle, at least a part of said electrode plate being made of a dielectric member.

5. An apparatus for detecting the position of a charged particle according to claim 1, wherein said vacuum duct includes a substantially cylindrical duct pipe through which said charged particle moves; and wherein each of said electrodes of said position detecting means includes an electrode plate provided in said duct pipe, a connector having one end electrically connected to said electrode plate and the other end extended to an exterior of said duct pipe so as to deliver the detection signal obtained on said electrode plate to the exterior of said vacuum duct, a grounded shield extending along the connector so as to cover at least the circumference of said connector and electrically insulated from said connectors, a supporting guide having means defining an opening through which said connector and said shield are led to the exterior from the interior of said duct pipe, said supporting guide forming a part of said duct pipe so that said electrode plate, said connector and said shield are supported on said duct pipe through said supporting guide, and an insulating member provided between the edge of said opening in said supporting guide and said shield so as to insulate said shield and said duct pipe.

6. An apparatus for detecting the position of a charged particle according to claim 5, wherein said supporting guide outwardly extends from said duct pipe so as to surround said shield and said connector without being electrically connected to said shield and said connector, and said opening is formed in the outer end of said supporting guide.

7. An apparatus for detecting the position of a charged particle according to claim 6, wherein said shield extends also along part of said electrode plate.

8. An apparatus for detecting the position of a charged particle according to claim 7, wherein at least a portion of said electrode plate facing said charged particle is formed of a dielectric member.

9. An apparatus for detecting the position of a charged particle according to claim 6, wherein said electrode plate extends along in side of said duct pipe without contacting said duct pipe.

10. An apparatus for detecting the position of a charged particle according to claim 9, wherein at least a portion of said electrode plate facing said charged particle is formed of a dielectric member.

11. An apparatus for detecting the position of a charged particle according to claim 5, wherein said connector includes a BNC connector while said insulating member is made of a ceramics material.

* * * * *